United States Patent Office 2,884,316
Patented Apr. 28, 1959

2,884,316

POLYCYCLIC ALCOHOLS PREPARED BY ETHYNYLATION OF A CONDENSATION PRODUCT OF A DIOLEFIN AND A FURFURAL

John E. Mahan and Charles W. Osborn, Bartlesville, Okla., assignors to Phillips Petroleum Company, a corporation of Delaware No Drawing. Application August 22, 1955
Serial No. 529,917

19 Claims. (Cl. 71—2.5)

This invention relates to polycyclic alcohols prepared by the ethynylation of, a condensation product of a conjugated diene and a furfural, and derivatives of said condensation product. In one aspect this invention relates to reacting a butadiene-furfural condensation product, or a derivative thereof, with an acetylene to produce new and novel polycyclic alcohols which contain acetylenic unsaturation. In another aspect this invention relates to using a polycyclic alcohol, prepared by ethynylating a condensation product of a butadiene and a furfural, or a derivative of said condensation product, as a plant defoliant.

Reaction of a conjugated diene, such as 1,3-butadiene and its immediate homologues, with a furfural, such as furfural itself and its immediate homologues, produces polycyclic reaction products of varied constitution which can be referred to broadly as butadiene-furfural condensation products or copolymers. There can be isolated from the complex reaction product a compound having the formula 2,3,4,5($\Delta^2$-butenylene)-tetrahydrofurfural which can be represented by the structural Formula I given below, when all the R, $R'_m$ and $R'_n$ in said structural formula are hydrogen.

One method for the preparation of 2,3,4,5-bis($\Delta^2$-butenylene)-tetrahydrofurfural comprises the inter-reaction of 1,3-butadiene with furfural at a temperature of from 200 to 300° F. for from 5 to 100 hours under sufficient pressure to maintain the reactants in liquid phase. This method and other suitable conditions and methods for making said compound are given in U.S. Patent 2,683,151, issued to J. C. Hillyer and D. A. Nicewander on July 6, 1954.

In addition to 1,3-butadiene and furfural as starting reactants, methyl derivatives thereof wherein not more than two carbon atoms of either the butadiene or the furfural has had a hydrogen atom replaced by a methyl group can be used to form the corresponding derivatives of 2,3,4,5-bis($\Delta^2$-butenylene)-tetrahydrofurfural which can be employed in accordance with the present invention. Furthermore, chloroprene (2-chloro-1,3-butadiene), 1-chloro-1,3-butadiene and methyl-substituted derivatives thereof wherein not more than one carbon atom has had a hydrogen atom replaced by a methyl group can be reacted with a furfural of the class described to produce the corresponding chlorine-containing derivatives of 2,3,4,5-bis($\Delta^2$-butenylene)-tetrahydrofurfural which exhibit high herbicidal and defoliant activity. Thus the butadiene starting material can be defined by the formula:

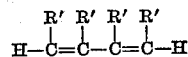

wherein each R′ is hydrogen, methyl, or chlorine and at least two R′ are hydrogen. The furfural starting material can be defined by the formula:

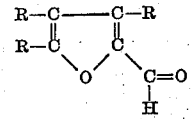

where each R is hydrogen or methyl and at least one R is hydrogen. The most commonly used reactants are 1,3-butadiene and furfural, isoprene and furfural, piperylene and furfural, chloroprene and furfural, and each of the said dienes with methyl furfural. All of the materials thus obtained will be described generically herein by the term "a condensation product of a butadiene with a furfural" and can be represented by the structural formula:

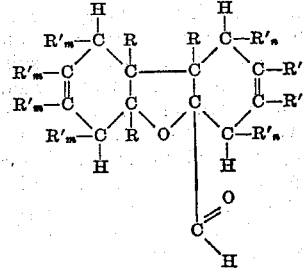

Formula I wherein R is hydrogen or a methyl radical, $R'_m$ is hydrogen, chlorine, or methyl radical, $R'_n$ is hydrogen, chlorine or a methyl radical, at least one R is hydrogen, at least two $R'_m$ are hydrogen, at least two $R'_n$ are hydrogen, not more than one $R'_m$ is chlorine, and not more than one $R'_n$ is chlorine.

When the condensation product shown in Formula I above is reacted under reducing conditions so as to effect hydrogenation of at least one of, or both, of its carbon to carbon double bonds there are obtained derivatives characterized by the following structural formulas:

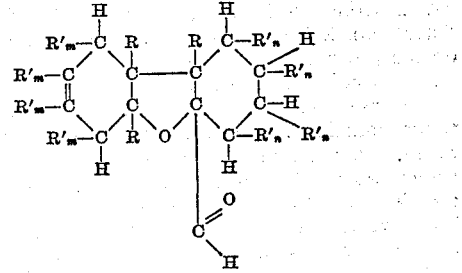

Formula II

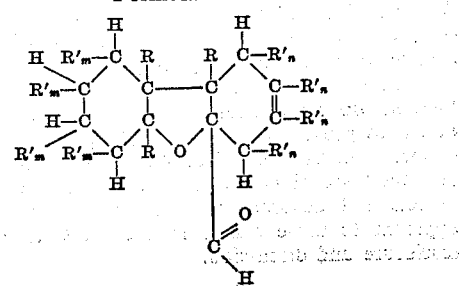

Formula III

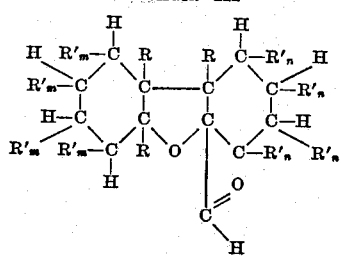

Formula IV wherein R, $R'_m$, and $R'_n$ are as defined above.

When all the R, $R'_m$, and $R'_n$ in Formula II are hydrogen the compound is 2,3-(butylene)-4,5-($\Delta^2$-butenylene) tetrahydrofurfural. When all the R, $R'_m$ and $R'_n$ in Formula III above are hydrogen the compound is 2,3($\Delta^2$-butenylene)-4,5 - (butylene) tetrahydrofurfural. When all the R, $R'_m$ and $R'_n$ in Formula IV above are hydrogen the compound is 2,3,4,5-bis-(butylene) tetrahydrofurfural.

The compounds of Formulas II, III, and IV can be prepared by reacting a compound characterized by Formula I in liquid phase with free hydrogen in the presence of a suitable hydrogenation catalyst, such as palladium, platinum, nickel, Raney nickel, etc., at a temperature approximating room temperature, such as in the range of about 20 to 40° C. Any suitable pressure can be employed in carrying out this reaction, the preferred pressure being within the range of 5-100 p.s.i.g., a pressure of from 30-40 p.s.i.g. generally being advantageously employed. Under these reaction conditions the aldehyde group remains unreacted. Suitable solvents chemically inert to the catalyst employed and the reactants can be employed. When it is desired to hydrogenate both carbon to carbon double bonds of a compound characterized by Formula I, to produce a compound characterized by Formula IV, the hydrogenation is preferably continued until substantially no further reaction occurs as manifested by constant pressure in the hydrogenation zone upon no further hydrogen being added. When it is desired to produce a compound characterized by Formula II and III, i.e., wherein only one of the carbon to carbon double bonds is hydrogenated, the hydrogenation can be terminated short of completion whereby reaction product is formed containing the mono-olefinic product, from which said mono-olefinic product can be recovered. The preparation of compounds characterized by Formulas II, III, and IV is disclosed and claimed in the copending application Serial No. 396,321, filed December 4, 1953, now Patent No. 2,795,592, of J. C. Hillyer. Further details on the preparation of said compounds can be found in said copending application.

We have now discovered that new polycyclic alcohols, which contain acetylenic unsaturation, can be prepared by the ethynylation of compounds characterized by the above described formulas I, II, III, and IV with an acetylene, employing heavy metal acetylides as catalysts. We have also discovered that the said new polycyclic alcohols are useful as plant defoliants.

An object of this invention is to provide new polycyclic alcohols which contain acetylenic unsaturation. Another object of this invention is to provide a method of preparing new polycyclic alcohols which contain acetylenic unsaturation by ethynylating a condensation product of a diolefin and a furfural, and derivatives thereof, with an acetylene. Another object of this invention is to provide new compounds useful for defoliating plants. Still another object of this invention is to provide new methods of defoliating plants. Still other aspects, objects and advantages of the invention will become apparent to those skilled in the art upon reading this disclosure and discussion.

Thus according to the invention there are provided new polycyclic alcohols, each characterized by the following structural formula:

Formula V wherein: X is selected from the group of radicals consisting of

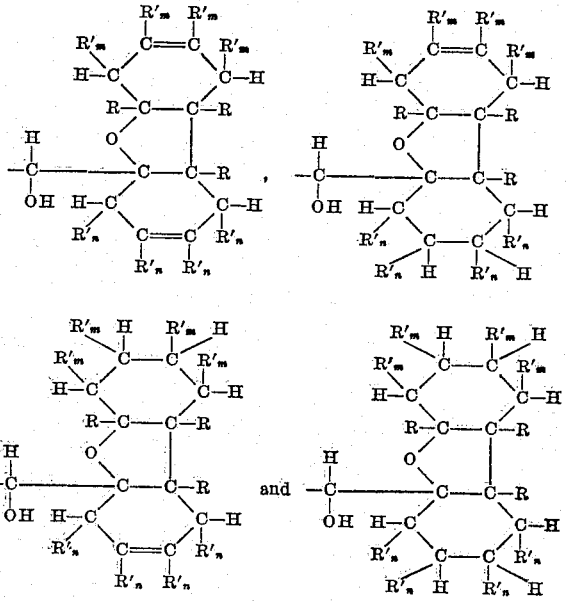

Y is selected from the group consisting of X, a hydrogen atom, a methyl radical, an ethyl radical, a vinyl radical, and a phenyl radical; each R is selected from the group consisting of a hydrogen atom and a methyl radical; each R' is selected from the group consisting of a hydrogen atom, a methyl radical and a chlorine atom; at least one R is hydrogen; at least two $R'_m$ are hydrogen; at least two $R'_n$ are hydrogen; not more than one $R'_m$ is chlorine; and not more than one $R'_n$ is chlorine.

The new compounds of the invention can be prepared by reacting any of the above described condensation products of a butadiene and a furfural, and derivatives of said condensation products, characterized by the above defined Formulas I, II, III, and IV, with acetylene or a substituted acetylene such as methylacetylene, ethylacetylene, vinylacetylene, phenylacetylene, and the like. Specific examples of compounds characterized by Formulas I, II, III, and IV, have been named above. Other examples of starting compounds which can be used to prepare the new compounds of the invention include, among others, 2,3-($\Delta^2$-butenylene)-4,5-(1-chlorobutylene) tetrahydrofurfural; 2,3-(1-methyl-4-chlorobutylene)-4,5-(1-chloro - $\Delta^2$ - butenylene) tetrahydrofurfural; and 3,4-dimethyl-2,3,4,5-bis(butylene) tetrahydrofurfural. Mixtures of the compounds characterized by Formulas I, II, III, and IV can also be used as starting material. Said reaction is carried out under ethynylation conditions employing the acetylides of copper, silver, mercury and gold as catalysts.

When using acetylene itself as a starting material the reaction can yield both mono-alcohols and di-alcohols. When using a substituted acetylene as a starting material only mono-alcohols are obtained. It is presently believed that, in the first instance, the mono-alcohol is formed first and then the di-alcohol is formed, i.e., when Y in the above Formula V is hydrogen, said hydrogen of the mono-alcohol reacts with the aldehyde group of another mol of the condensation product starting material to form the di-alcohol.

The new mono-alcohols of the invention are each characterized by one of the following structural formulas:

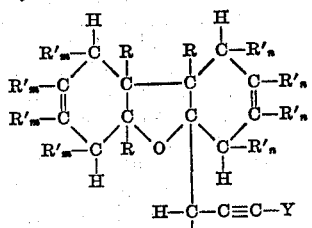

Formula VI

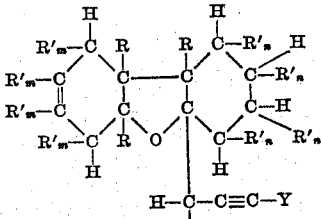

Formula VII

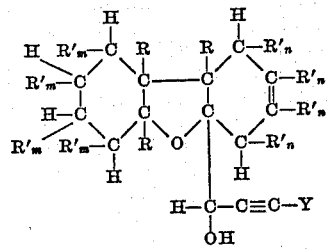

Formula VIII and

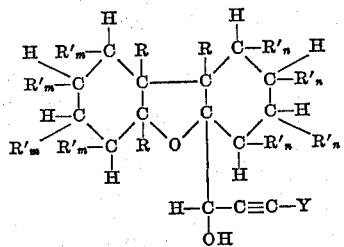

Formula IX wherein R, R'$_m$, and R'$_n$ are as previously defined and Y is selected from the group consisting of a hydrogen atom, a methyl radical, an ethyl radical, a vinyl radical, and a phenyl radical. Obviously when mixtures of the compounds characterized by Formulas I, II, III, and IV are used as starting materials mixtures of the mono-alcohols characterized by Formulas VI, VII, VIII, and IX will be obtained.

Examples of the new mono-alcohols which can be prepared by the method of the invention include, among others, the following: α-ethynyl-2,3,4,5-bis(Δ$^2$-butenylene) tetrahydrofurfuryl alcohol; α-ethynyl-2,3-(butylene)-4,5-(Δ$^2$-butenylene) tetrahydrofurfuryl alcohol; α-ethynyl-2,3-(Δ$^2$-butenylene) - 4,5 - (butylene) tetrahydrofurfuryl alcohol; α-ethynyl - 2,3,4,5 - bis(butylene) tetrahydrofurfuryl alcohol; α-(propynyl-1)-2,3-(2-chlorobutylene)-4,5-(Δ$^2$-butenylene) tetrahydrofurfuryl alcohol; α-(2-phenylethynyl)-2,3-(2-chloro-Δ$^2$-butenylene) - 4,5 - (1-methyl-4-chlorobutylene) tetrahydrofurfuryl alcohol; α-(butynyl-1)-3-methyl-2,3-(2,3-dimethylbutylene)-4,5-(2-chloro - 3-methyl - Δ$^2$ - butylene) tetrahydrofurfuryl alcohol; and α-ethynyl-2,3,4,5-bis(2-methyl-Δ$^2$-butenylene) tetrahydrofurfuryl alcohol.

When acetylene is used as a starting material in preparing the compounds characterized by the above Formulas VI, VII, VIII, and IX, Y in said formulas will be hydrogen. When Y is hydrogen it represents an unreacted acetylenic hydrogen which, as mentioned above, can react with the aldehyde group of another mol of the condensation product to form the di-alcohol. Thus the method of preparing the mono-alcohols of the invention is also applicable for the preparation of compounds wherein both hydrogen atoms of acetylene react with the aldehyde group of a condensation product of a butadiene with a furfural or derivative of said condensation product. The products in such instances are the new di-alcohols of the invention. When a substituted acetylene, such as ethyl acetylene is used, Y in said Formulas VI, VII, VIII, and IX will be ethyl and only a mono-alcohol can be obtained.

One of the new di-alcohols of the invention can be characterized by the following structure formula:

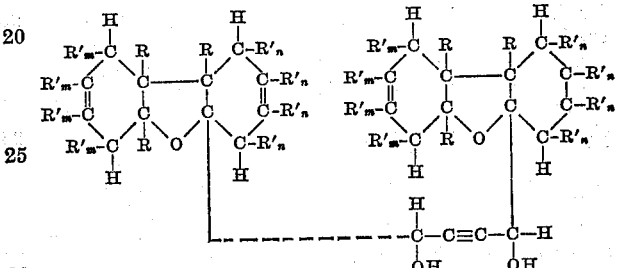

Formula X wherein R, R'$_m$, and R'$_n$ are as defined above. When all of the R, R'$_m$, and R'$_n$ the above Formula X are hydrogen the compound is 1,4-dihydroxy-1,4-di[2-{2,3,4,5-bis(Δ$^2$-butenylene) tetrahydrofuryl}]butyne-2.

It will be understood by those skilled in the art, in view of the above generic Formula V, that other di-alcohols having structural formulas similar to that of Formula X above can be prepared by the method of the invention. The compound characterized by Formula X is obtained when the compound characterized by Formula I is used as a starting material. When the compounds characterized by Formulas II, II, and IV are each used as a starting material there is obtained, in each instance, a di-alcohol having a structural formula wherein both ring portions of the formula are the same as the ring portion of the formula of the starting material. When the compound characterized by Formula II, and wherein said formula all the R, R'$_m$ and R'$_n$ are hydrogen, is used as a starting material the di-alcohol obtained is 1,4-dihydroxy-1,4-di[2-{2,3-(butylene) - 4,5 - (Δ$^2$-butenylene) tetrahydrofuryl}]butyne-2. When the compound characterized by Formula III, and wherein said formula all the R, R'$_m$ and R'$_n$ are hydrogen, is used as a starting material the di-alcohol obtained is 1,4 - dihydroxy-1,4-di[2-{2,3-(Δ$^2$-butenylene) 4,5 - (butylene) tetrahydrofuryl}]butyne-2. When the compound characterized by Formula IV, and wherein said formula all the R, R'$_m$ and R'$_n$ are hydrogen, is used as a starting material the di-alcohol obtained is 1,4-dihydroxy - 1,4 - di[2-{2,3,4,5 bis(butylene) tetrahydrofuryl}]butyne-2.

It will also be readily understood by those skilled in the art that when a mixture of compounds characterized by Formulas I, II, III, or IV are used as starting material a mixture of di-alcohols, characterized by structural formulas similar to Formula X and in which said formulas the ring portions will be the same as in the starting materials, is obtained. An example of such a di-alcohol, is 1,4-dihydroxy - 1 - [2 - {2,3 - (1 - chloro - Δ$^2$ - butenylene)-4,5(1 - methylbutylene) tetrahydrofuryl}] - 4 - [2 - {2,3-(1 - methylbutylene) - 4,5 - (Δ$^2$ - butenylene) tetrahydrofuryl}]butyne-2.

A presently preferred method of carrying out this ethnylation reaction is to use water as the reaction media in combination with sufficient organic solvent to insure that all of the reactants will go into the solution, thus achieving homogeneous reaction mixtures. It has been found that the reaction proceeds at a faster rate when homogeneous reaction mixtures are employed. For this reason solvents miscible with water under reaction conditions are preferred. Some examples of suitable organic solvents are methyl alcohol, propyl alcohol, dioxane, butyl lactone, N-methyl pyrrolidone, and the like. The organic solvent employed should be chemically inert with respect to the reactants and catalyst, and the reaction product. Thus any organic solvent can be employed which is miscible with water under the conditions at which the reaction is carried out and which is chemically inert with respect to said reactants and said product. The amount of organic solvent used will, of course, depend upon the specific butadiene-furfural aldehyde condensation product and the specific acetylenic reactant which are being used.

The pressures under which the ethynylation reaction for the production of these new and novel compounds is carried out can vary in the range from 5 to 60 atmospheres, preferably from 10 to 40 atmospheres. The temperature for the ethynylation can vary in the range between 80 to 175° C., preferably between 120 and 150° C. Higher temperatures should be avoided due to the inherent hazards of handling acetylene at these higher temperatures, and consequently, higher pressures.

The catalysts for the ethynylation reaction, the heavy metal acetylides described above, are most conveniently used when deposited on an inert carrier material. Suitable carrier materials are, for example, silica gel, magnesium silicate, kieselguhr, and the like. These heavy metal acetylide supported catalysts can be prepared by the usual methods well known in the art, e.g., impregnation of the carrier with a cupric salt, reduction of said salt to cuprous form by the use of formaldehyde, and conversion to the acetylide by reaction with acetylene.

The reaction of this invention is preferably carried out in an agitated reactor. The reactor can be of the rocking-autoclave type or reactors employing stirrers can be used. The reactor should, of course, be of sufficient strength to withstand the pressures normally encountered when handling acetylene at the temperatures which are employed in the reaction.

The use of acetylene or substituted acetylenes, as described above, diluted with an inert diluent such as carbon dioxide, nitrogen, or the like may be advantageously employed in the method of preparing our new compounds as it enables the reaction to be carried out under conditions which are less hazardous. However, the reaction rate may be somewhat lower when diluents are employed. Hydrocarbons such as propane can also be employed as diluents.

Example I

A 3-liter stainless steel rocking autoclave was charged with 102 grams of the condensation product of butadiene and furfural [2,3,4,5-bis($\Delta^2$-butenylene) tetrahydrofurfural], 500 cc. of n-propyl alcohol, 150 cc. of water and 100 cc. of ethynylation catalyst. The butadiene furfural condensation product which had been purified by distillation had a boiling point of 93° C. at 0.2 mm. of mercury and a refractive index at 20° C. of 1.5248.

The ethynylation catalyst was prepared according to the following procedure. Five hundred cc. of 1/8-inch pellets of magnesium silicate which was impregnated with copper and bismuth oxides (obtained from Harshaw Chemical Company) were placed in a wire cage which was held in a 3-liter stainless steel rocking autoclave. This catalyst is reported to contain 12.56 weight percent copper, 2.6 weight percent bismuth, 3.04 percent graphite and 81.8 weight percent magnesium silicate. The copper and bismuth are believed to be present as the oxides. The material shows a loss of 3.94 weight percent on ignition. Three hundred cc. of a 38 weight percent formalin solution and 200 cc. of water were then charged to the autoclave. The autoclave and contents were then heated to 75° C. under nitrogen pressure and were maintained at this temperature for approximately two hours. At the end of this period, the temperature was raised to 110° C. and propane was added until a pressure of 110 p.s.i.g. was reached. After the propane was added, acetylene was charged until a pressure of about 205 p.s.i.g. total pressure was obtained. The contents of the reactor were heated at about 110° C. for approximately 8½ hours. The reaction vessel was subsequently cooled to room temperature, and the solid catalyst was washed with water. This catalyst was given a second treatment with dilute formaldehyde and acetylene at 110° C. following essentially the same procedure as previously described. The catalyst pellets were again washed with water after cooling, and were given a third treatment with a fresh formalin solution and acetylene at about 110° C. in essentially the same manner as was used in the second treatment. After an 8½-hour treatment under these conditions, the reactor was cooled, and the catalyst pellets were washed and stored under water. This catalyst was now fully developed and was an active ethynylation catalyst.

The reaction vessel was charged with the aldehyde, propyl alcohol, water and ethynylation catalyst and was pressured to 50 p.s.i.g. with propane and then to 200 p.s.i.g. with acetylene at room temperature. The reactor and contents were then heated gradually, and it was noted that there was a considerable pressure drop as the acetylene dissolved. The pressure then increased to about 260 p.s.i.g. when the temperature had reached 134° C. The reaction was allowed to continue at a pressure of about 230 p.s.i.g. for 11 hours. There was no appreciable pressure drop during this reaction period. After cooling the reactor, the solution was recovered and the catalyst was washed with methyl alcohol. The methyl alcohol and liquid reaction product were combined and the mixture was filtered to remove catalyst fines. The methyl alcohol and propyl alcohol were removed from the reaction mixture by distillation at atmospheric pressure. The residue from this distillation consisted of an aqueous phase and an oil phase.

The oil phase was separated from the aqueous phase, and was distilled through a 14-inch Vigreux column at a pressure of 0.1–0.15 mm. of mercury. Approximately 85 cc. of organic material was taken overhead and about 5–10 grams remained as a viscous liquid. The overhead fractions from this distillation were combined and redistilled through the same column at a pressure of 1.5–3 mm. of mercury. Three fractions, totaling approximately 54 cc. of the overhead material, were recovered as the desired ethynylation product. In addition, some lower boiling intermediate products and about 5 cc. of a residue were also recovered from the distillation. The 54 cc. (61 grams) of alpha-ethynyl-2,3,4,5-bis($\Delta^2$-butenylene) tetrahydrofurfuryl alcohol represented a yield of about 53 weight percent of theoretical based on the aldehyde charged. The three fractions which were combined to yield the 54 cc. of product referred to above had a refractive index ranging from 1.5382–1.5415 at 20° C. and had a boiling point ranging from 150° C. at 2.1 mm. of mercury to 147° C. at 1.5 mm. of mercury. This material was a viscous liquid and was almost water white in color.

Example II

The ethynylation of the butadine furfural condensation product described in Example I was carried out in a 3-liter stainless steel rocking autoclave. The charge to the autoclave consisted of 102 grams of the condensation product (from the same purified material described in Example I), 429 grams of methyl alcohol, 100 grams of water and 100 cc. pelleted ethynylation catalyst. The ethynylation catalyst was copper acetylide deposited on magnesium silicate and was prepared in a similar manner to that described in Example I. The reaction was carried out at about 130° C. and sufficient of an equimolar mixture of propane and acetylene had been charged to the reactor to maintain a pressure of 225 p.s.i.g. at this temperature. The reaction was allowed to continue at 130° C. for about 8 hours. Since it did not appear that much, if any, reaction occurred, the reactor was cooled to room temperature, was vented to the atmosphere, and the vapor space was flushed with propane. The reactor was then pressured to 50 p.s.i.g. with propane, and then to a total pressure of 250 p.s.i.g. with acetylene. The valve in the acetylene line was then closed, and the reactor was heated to about 130° C. at which point a pressure of 500–600 p.s.i.g. was obtained. After heating for 6½ hours at about 130° C., the pressure had dropped to 475 p.s.i.g., and on cooling to room temperature, it dropped to 180 p.s.i.g.

The reactor was vented, and the liquid product was drained from the catalyst pellets. The catalyst fines were filtered from the liquid product, and then the methyl alcohol was removed by distillation through a 24-inch packed column. The residue consisted of an aqueous layer and an organic layer, the latter being the more dense of the two. The residue was cooled, the layers were separated, and the total organic layer was distilled at a pressure of 0.2–0.3 mm. of mercury in a 14-inch Vigreux column. After removing some unreacted aldehyde and intermediate reaction products, the desired product, alpha-ethynyl-2,3,4,5-bis($\Delta^2$-butenylene) tetrahydrofurfuryl alcohol ($C_{15}H_{18}O_2$) was recovered at an overhead temperature of about 108–117° C. at a pressure of 0.2 mm. of mercury. The yield of the desired alkynol was approximately 50–55 weight percent based on the aldehyde charged to the reaction zone. This material was a viscous pale yellow liquid when analyzed qualitatively. Using ammoniacal silver nitrate, a positive test for acetylenic hydrogen was obtained. When a qualitative test for aldehyde was employed on this product, a negative test was obtained. A small amount of a slightly higher boiling fraction and a small amount of viscous light brown residue were also recovered.

The heart cuts from the preceding distillation were combined and refractionated through a 14-inch Vigreux column. In this case the pressure was maintained at approximately 2.8 to 3 mm. of mercury during the distillation. A heart cut from this redistillation was analyzed for carbon and hydrogen. The weight percent carbon was found to be 77.10 and the weight percent hydrogen was found to be 6.37. The theoretical for the product $C_{15}H_{18}O_2$ is 78.3 weight percent carbon and 7.83 weight percent hydrogen. The density of this fraction was found to be 1.1364 grams per cc. at 20° C.

It has been observed that the reaction of acetylene with high boiling aldehydes of the type employed in this invention as starting materials proceeds at a relatively slow rate. Therefore, it is presently believed that a reaction period of 6 to 12 hours would probably be required to obtain reasonable yields. Shorter or longer reaction periods can be employed. No initiation period is required however and, therefore, when reaction periods of less than six hours are employed the conversion to the desired product will probably be substantially reduced. The reaction rate can probably be increased by increasing the reaction temperature and also by carrying the reaction out on a continuous basis in a tubular reactor or the like. The use of solvents which provide a homogeneous liquid phase also increases the reaction rate.

It is to be understood that the examples included herein are primarily for illustrative purposes and the reaction conditions, proportions of reagents employed etc. employed therein are not to be interpreted as unduly limiting the invention.

It will be realized by those skilled in the art that in the above Examples I and II the proportions of reagents are chosen so as to favor the formation of the mono-alcohol product, i.e., a molar excess of acetylene is employed and only a small amount of the di-alcohol product is obtained as a high boiling residue. It will be understood by those skilled in the art that when a more nearly equal molar ratio of the starting materials is employed conditions for the formation of di-alcohol products of a type such as Formula X are more favorable; when an excess of aldehyde starting material is employed, formation of said di-alcohol products is favored.

Our new alcohols are useful as plant defoliants. Plant defoliating agents are widely used to expedite the harvest of mature cotton, tomatoes, beans, and other crops. Their purpose is to provide an effect similar to that produced by a light frost which causes dropping of the leaves from the plants. Defoliation is especially advantageous in the harvesting of cotton, particularly where the cotton is to be picked by mechanical pickers or strippers. In addition to the advantage of ease of harvesting, defoliated cotton has the advantages that the bolls tend to open faster, boll rot is reduced or prevented altogether, and fiber and seed deterioration is retarded. Still further advantages in the use of chemical defoliation of cotton is that the defoliant aids in eliminating a source of green leaf stain to the lint, and reduces the amount of trash in the harvested cotton which would be difficult to remove when the cotton is ginned.

The defoliants of this invention are effective in bringing about the defoliation of plants when applied thereto in the range between 0.1 and 10 lbs. per acre, preferably between 0.5 and 5 lbs. per acre. A desired amount of the defoliant within this range can be applied to the plants which are to be defoliated in such forms as solutions, emulsions, aerosols, fogs, dusts and the like.

Our defoliants are particularly effective when applied as solutions in hydrocarbon oils, e.g., oils which boil in the range between 200 and 800° F., preferably between 300 and 600° F. Such hydrocarbon oils include isoparaffins such as are obtained in the alkylation of paraffins with olefins using such catalysts as hydrogen fluoride, aluminum chloride, sulfuric acid and the like; also, kerosene, fuel oil, Stoddard solvent, diesel fuel, and the like. While the solvent usually employed is preferably paraffinic, it can contain aromatic hydrocarbons, or aromatic hydrocarbons alone can be employed as the solvent.

When fogging methods are employed to apply our defoliating agents to plants, temperatures in the fog generating devices should be below the temperature at which the defoliant compounds decompose.

The defoliants of this invention can be applied as aqueous emulsions in the form of a spray and are also adaptable for application as mechanical dispersions or mists such as are produced by high velocity air jet devices. When preparing aqueous emulsions, wetting agents such as alkyl aryl polyether alcohols, alkali salts or disproportionated rosin acids, and the like may be employed in sufficient quantity to stabilize the emulsions.

When dusts are to be employed, suitable dry carriers such as talc, kieselguhr, and other inert carriers can be used. When any of the above named methods of applying these defoliants are employed, any carrier material, either liquid or dry, can be used so long as the carrier is inert with respect to the active defoliant material and does not produce a harmful effect on cotton, tomatoes, beans, or other crops being harvested when applied to the plant bearing said crop for defoliating purposes.

*Example III*

The reaction product as prepared above in Example II was sprayed onto a mature cotton plant in a Peet-Grady chamber, having 36 sq. ft. of floor area, at the rate of 0.5 gram per 36 sq. ft. This rate of application corresponds to a rate application in the field of 1.33 lbs. per acre. In 7 days, 15 percent of the leaves originally on the plant had defoliated. After 11 days, 100 percent defoliation had occurred, and terminal growth which had appeared since the spraying, began to defoliate one day later.

It will be appreciated that many modifications of our invention can be made, based upon the disclosure and discussion contained herein, without departing from the spirit or scope thereof, and without departing from the scope of the claims.

We claim:

1. A polycyclic alcohol characterized by a structural formula selected from the group of structural formulas consisting of:

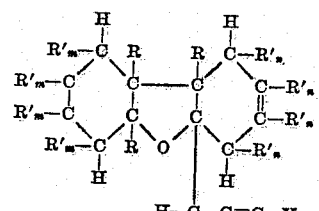

Formula VI

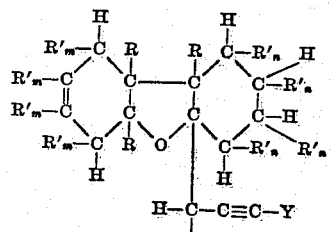

Formula VII

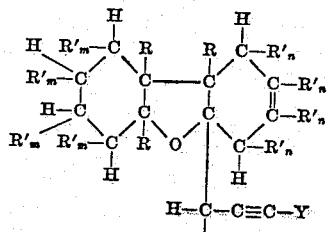

Formula VIII and

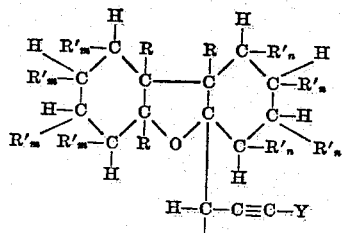

Formula IX wherein: Y is selected from the group consisting of a hydrogen atom, a methyl radical, an ethyl radical and a phenyl radical; each R is selected from the group consisting of a hydrogen atom and a methyl radical; each R'$_m$ and each R'$_n$ is selected from the group consisting of a hydrogen atom, a methyl radical, and a chlorine atom; at least one R is hydrogen; at least two R'$_m$ are hydrogen; at least two R'$_n$ are hydrogen; not more than one R'$_m$ is chlorine; and not more than one R'$_n$ is chlorine.

2. A process for the preparation of a polycyclic alcohol charactertized by a structural formula selected from the group of structural formulas consisting of Formula VI, Formula VII, Formula VIII and Formula IX as given and defined in claim 1, which process comprises reacting a polycyclic aldehyde characterized by a structural formula selected from the group consisting of

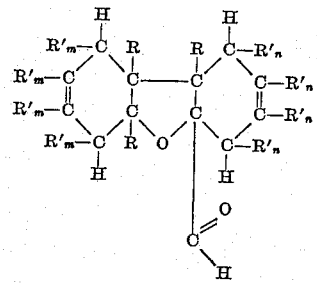

Formula I

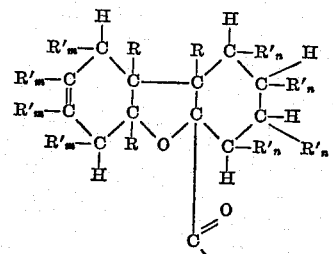

Formula II

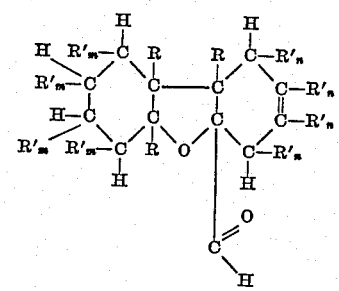

Formula III and

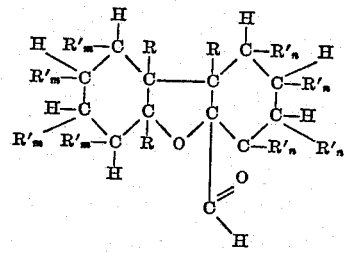

Formula IV wherein: R, R'$_m$ and R'$_n$ are as defined in claim 1; with an acetylenic compound selected from the group consisting of acetylene, methyl acetylene, ethyl acetylene, and phenyl acetylene; under ethynylation conditions; in the presence of an acetylide of a metal selected from the group consisting of copper, silver, mercury and gold as a catalyst; and recovering said alcohol from products of said reaction.

3. A process for the prepartion of alpha ethynyl-2,3,4,5-bis ($\Delta^2$-butenylene)-tetrahydrofurfuryl alcohol which comprises reacting 2,3,4,5-bis ($\Delta^2$-butenylene)-tetrahydrofurfural with acetylene in the presence of a copper acetylide catalyst at a temperature within the range of 80–175° C., a pressure within the range of 5 to 60 atmospheres and in a reaction media comprising water and a solvent chemically inert under said reaction conditions, and recovering said alcohol.

4. A method of defoliating plants which comprises applying to the leaves thereof only sufficient of a polycyclic alcohol to cause dropping of the leaves, said polycyclic alcohol being characterized by a structural formula selected from the group of structural formulas consisting of Formula VI, Formula VII, Formula VIII, and Formula IX as given and defined in claim 1.

5. Alpha ethynyl-2,3,4,5-bis($\Delta^2$-butenylene)-tetrahydrofurfuryl alcohol.

6. The method of defoliating plants which comprises applying to the leaves thereof only sufficient of alpha ethynyl-2,3,4,5-bis($\Delta^2$-butenylene)-tetrahydrofurfuryl alcohol to cause dropping of said leaves.

7. Alpha ethynyl-2,3-(butylene)-4,5-($\Delta^2$-butenylene)-tetrahydrofurfuryl alcohol.

8. Alpha ethynyl-2,3-($\Delta^2$-butenylene)-4,5-(butylene)-tetrahydrofurfuryl alcohol.

9. Alpha ethynyl-2,3,4,5-bis(butylene)-tetrahydrofurfuryl alcohol.

10. The process of claim 2 wherein said polycyclic aldehyde is 2,3,4,5-($\Delta^2$-butenylene)-tetrahydrofurfural, said acetylenic compound is acetylene, said metal acetylide is copper acetylide, and said recovered polycyclic alcohol is alpha ethynyl-2,3,4,5-bis($\Delta^2$-butenylene)-tetrahydrofurfuryl alcohol.

11. The process of claim 2 wherein said polycyclic aldehyde is 2,3-(butylene)-4,5-($\Delta^2$-butenylene) tetrahydrofurfural, said acetylenic compound is acetylene, said metal acetylide is copper acetylide, and said recovered polycyclic alcohol is alpha ethynyl-2,3-(butylene)-4,5-($\Delta^2$-butenylene)-tetrahydrofurfuryl alcohol.

12. The process of claim 2 wherein said polycyclic aldehyde is 2,3-($\Delta^2$-butenylene)-4,5-(butylene) tetrahydrofurfural, said acetylenic compound is acetylene, said metal acetylide is copper acetylide, and said recovered polycyclic alcohol is alpha ethynyl-2,3-($\Delta^2$-butenylene)-4,5-(butylene)-tetrahydrofurfuryl alcohol.

13. The process of claim 2 wherein said polycyclic aldehyde is 2,3,4,5-bis-(butylene)-tetrahydrofurfural, said acetylenic compound is acetylene, said metal acetylide is copper acetylide, and said recovered polycyclic alcohol is alpha ethynyl-2,3,4,5-bis (butylene)-tetrahydrofurfuryl alcohol.

14. The process of claim 11 wherein said reaction is carried out in a reaction media comprising water and an organic solvent which is chemically inert under the reaction conditions, at a temperature within the range of 80 to 175° C., and a pressure within the range of 5 to 60 atmospheres.

15. The process of claim 12 wherein said reaction is carried out in a reaction media comprising water and an organic solvent which is chemically inert under the reaction conditions, at a temperature within the range of 80 to 175° C., and a pressure within the range of 5 to 60 atmospheres.

16. The process of claim 13 wherein said reaction is carried out in a reaction media comprising water and an organic solvent which is chemically inert under the reaction conditions, at a temperature within the range of 80 to 175° C., and a pressure within the range of 5 to 60 atmospheres.

17. The method of defoliating plants which comprises applying to the leaves thereof only sufficient of alpha ethynyl-2,3-butylene-4,5-($\Delta^2$-butenylene)-tetrahydrofurfuryl alcohol to cause dropping of said leaves.

18. The method of defoliating plants which comprises applying to the leaves thereof only sufficient of alpha ethynyl-2,3-($\Delta^2$-butenylene)-4,5-(butylene)-tetrahydrofurfuryl alcohol to cause dropping of said leaves.

19. The method of defoliating plants which comprises applying to the leaves thereof only sufficient of alpha ethynyl-2,3,4,5-bis(butylene)-tetrahydrofurfuryl alcohol to cause dropping of said leaves.

References Cited in the file of this patent

UNITED STATES PATENTS

| 2,610,116 | Goodhue | Sept. 9, 1952 |
| 2,687,419 | Hillyer | Aug. 24, 1954 |